350-6.91
E197A XR 3,343,451
TX350-6.91

Sept. 26, 1967 H. R. DUROCHER 3,343,451

SELF-DECODING INLINE READOUT

Filed Aug. 4, 1965 2 Sheets-Sheet 1

INVENTOR.
HECTOR ROMEO DUROCHER
BY [signature]
ATTORNEY

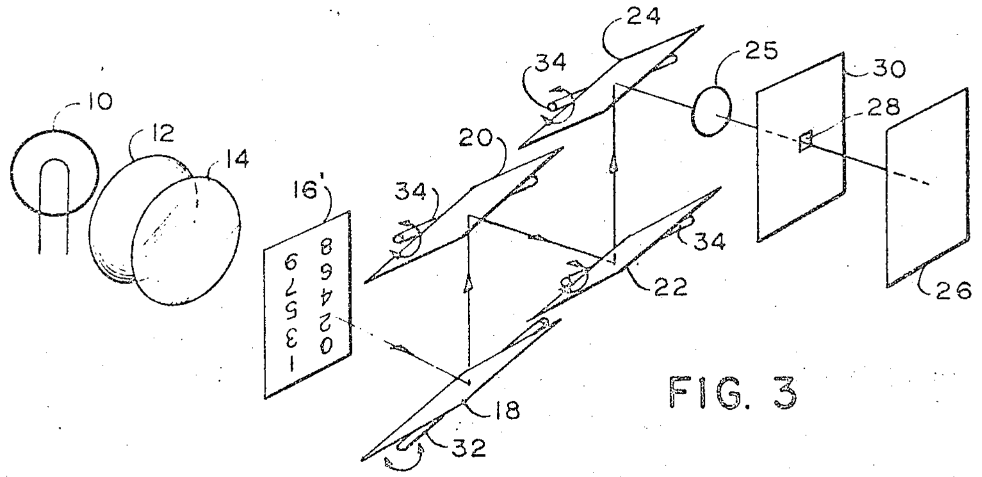
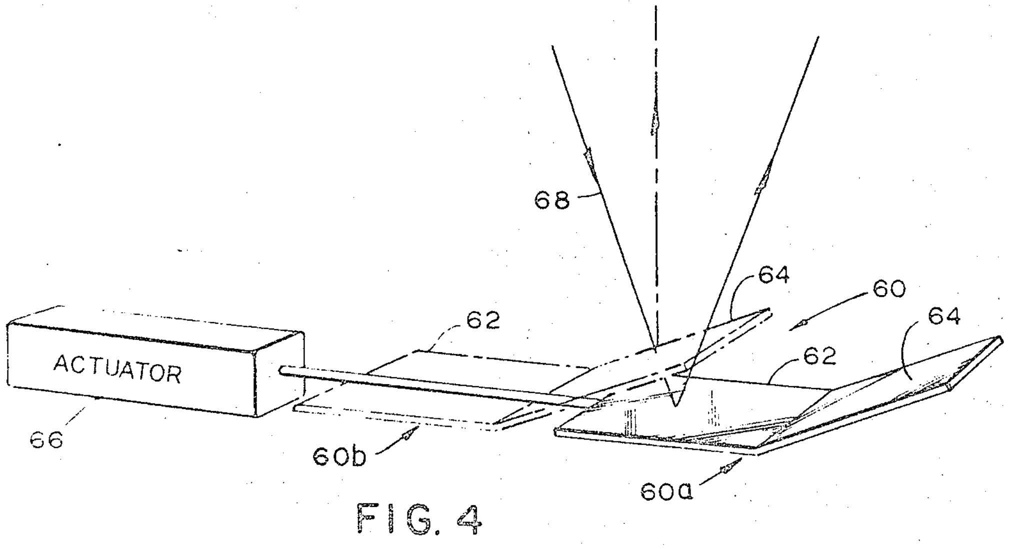
FIG. 4
INVENTOR.
HECTOR ROMEO DUROCHER.
BY
ATTORNEY 3,343,451
SELF-DECODING INLINE READOUT
Hector Romeo Durocher, Nashua, N.H., assignor to Sanders Associates, Inc., Nashua, N.H., a corporation of Delaware
Filed Aug. 4, 1965, Ser. No. 477,234
3 Claims. (Cl. 88—24)

This invention relates to an information readout device of the optical projection type wherein a selected item of information on an image record is projected on a viewing screen. More particularly, the invention provides an information readout device wherein digital beam-shifting devices move an optical beam to project a selected item of recorded information onto a viewing screen.

It is an object of the invention to provide a high performance optical information readout device.

Another object of the invention is to provide an optical information readout device suited for reading out an item of information selected from a relatively large library of information items. A more particular object is to provide such a readout device further characterized by high speed operation.

It is also an object of the invention to provide an information readout device responding to coded digital electrical input signals applied in parallel.

A further object of the invention is to provide an optical information readout device responding to electrical input signals that holds a display after the initiating signals have terminated.

It is also an object of the invention to provide a device of the above type having relatively few moving parts.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 3 is a simplified perspective view of a readout device similar to FIGURE 1; and FIGURE 4 shows an alternative arrangement for the digitally actuated optical reflectors used in the readout devices of FIGURES 1 and 3.

In general, the present readout device employs one or more beam shifters, each of which is operable to bend an optical beam to any one of two or more preselected positions. Each beam shifter is operated with the electrical signals identifying one digit in a number identifying the item of information to be displayed. The beam shifters thus respond directly to the signals developed in conventional digit data processing machines; no intermediate decoding equipment is needed.

The beam shifters are arranged in tandem, optically aligned between an image record having information items recorded thereon and a viewing or display screen.

With this arrangement, different combinations of the positions of the several beam shifters project onto the screen the images of different items on the image record, so that each information item can be displayed separately from the other items on the record.

The beam shifters are preferably stable in all their positions so that they maintain an item on display after the electrical signal corresponding to the item has terminated.

Figure 1:
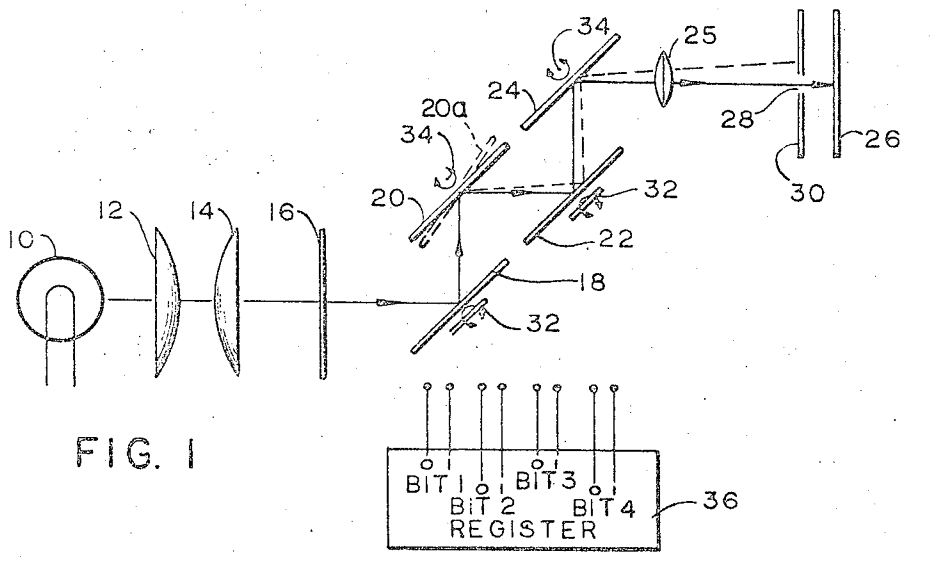
FIGURE 1 is a diagrammatic representation of an optical readout device embodying the invention.

More particularly, referring to FIGURE 1, the illustrated optical readout device has an optical source in the form of a lamp 10 directing a beam of light on lenses 12 and 14 forming an optical condensing system. An image record 16 is in optical alignment with the lens system so as to be fully illuminated by the beam. A "bit 1" mirror 18 intercepts the beam of light after it passes through the image record and reflects it to a "bit 2" mirror 20 which again reflects the beam to a "bit 3" mirror 22. A "bit 4" mirror 24 intercepts the beam reflected from the bit 3 mirror 22 and reflects it through a projecting lens 25 onto a viewing screen 26 disposed in front of an aperture 28 in an optical shield 30.

The mirrors 18 and 22 are arranged to rotate through generally different angles from ZERO positions (shown) to ONE positions. They rotate about axes 32 parallel to these mirrors and lying in the plane of the drawing. Such rotation moves the reflected beam along planes transverse to the plane of the drawing, i.e. into and out of the plane of the drawing.

The remaining mirrors 20 and 24 rotate about axes 34 transverse to the plane of the drawing between ZERO positions and ONE positions. The ZERO position of the mirror 20 is indicated with a full line and the ONE position is shown in dashed lines at *20a*.

The mirrors 18–24 are rotated by means of actuators (not shown in FIGURE 1, but described below with reference to FIGURE 2) in response to digital signals received from a four-stage register 36. The register has ZERO and ONE output terminals for each of the bits 1, 2, 3 and 4 comprising binary numbers representing items of information to be selected from the plate 16.

The mirror arrangement in FIGURE 1, where one pair of mirrors rotate about a first axis and another pair of mirrors rotate about a transverse axis, is suited for use with an image record having up to sixteen items of information recorded thereon as transparencies and arranged in a square matrix having four columns and four rows, as

ABCD
EFGH
IJKL
MNOP

The reflected beam leaving the last mirror 24 may contain the images of a number of the items on the plate 16, in fact it may contain images of all the items. However, the aperture 28 is preferably large enough to admit the image of only a single item and this item is the one displayed on the screen 26. The mirrors 18–24 operate to shift the beam vertically and horizontally on the shield 30 and thereby position it so that selected items are projected through the aperture 28 according to the combination of ZERO and ONE mirror positions imposed by the electrical input.

Thus, when all the mirrors 18–24 are in their ZERO positions, the item of information located in column 1, row 1, i.e. the character A, is the only item projected through the aperture 28 in the mask 30 and hence appearing on the viewing screen 26. Further, by way of illustration, with a preferred mirror and actuator arrangement, when bit 1 is a ONE and the remaining bits are ZEROS, the shift of the optical beam due to rotation of mirror 18 projects the item in the third column in the top row, i.e. the character C, onto the viewing screen 26. Similarly, when only bit 3 is a ONE, mirror 22 is rotated through a different angle to project the character B, located in the top row in column two, onto the screen 26. Finally, when both bits 1 and 3 are ONEs, an item in the fourth column on the image plate is projected onto the viewing screen 26.

The row-selecting mirrors 20 and 24 are then similarly arranged, such that when mirror 20 is in the ONE position, an item in the third row is projected on the viewing screen, when bit 4 is a ONE, the mirror 24 is rotated to display an item in the second row down and when both bits 2 and 4 are ONEs, an item in row four is projected through the mask aperture 28 onto the viewing screen. Thus, with different combinations of mirror positions, each of the sixteen characters of the image plate 16 is projected separately onto the viewing screen 26.

Figure 2:
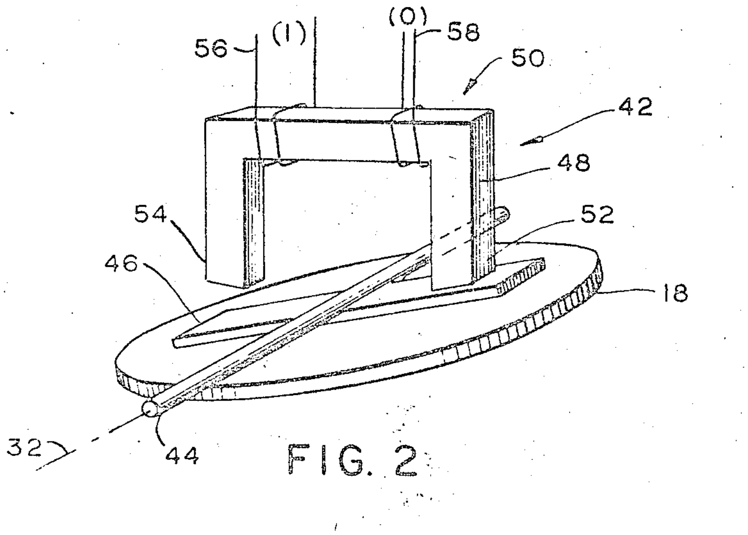
FIGURE 2 is a diagrammatic representation of a digital optical beam shifter for use in the readout devices of FIGURES 1 and 3.

Turning to FIGURE 2, an actuator indicated generally at 42 for rotating the mirror 18 is appropriately constructed by mounting the mirror on a shaft 44 coaxial with the rotation axis 32 of the mirror. A permanent magnet 46 is secured to the back of the mirror 18. The magnet extends transversely to the shaft 44.

An electromagnet indicated at 50 has a core 48 with a pole piece 52 that engages the magnet 46 when the mirror is in the ZERO position, shown, and a pole piece 54 that alternatively engages the magnet when the mirror is in the ONE position. The core 48 carries a winding 56 energized to place the mirror in the ONE position and an oppositely-wound winding 58 energized to rotate the mirror to the ZERO position.

The permanent magnet 46 develops a magnetic field substantially weaker than the field developed by the electromagnet 50. Thus, when the mirror is in the ZERO position as shown, and the winding 56 receives a signal to place the mirror in the ONE position, the electromagnet develops a field opposite to the field of the permanent magnet 46 at the pole piece 52, thereby repulsing the permanent magnet from the pole piece 52 and attracting it to the pole piece 54. The mirror accordingly rotates about the shaft 44 until the magnet 46 engages the pole piece 54. The field of the permanent magnet then maintains the mirror in this position even after the signal in the winding 56 terminates.

The electromagnet 50 can, of course, have only a single winding on the core 48, in which case the position of the mirror 18 is changed by use of opposite polarity currents.

The actuator 42 can, alternatively, be constructed to be monostable rather than bistable as illustrated. Such an actuator requires only one winding and has a spring or like device urging the mirror to, say, the ZERO position. The mirror then rotates to the ONE position, against the spring, only when current is in the coil.

Turning now to FIGURE 3, a digital readout device similar to that shown in FIGURE 1 comprises, in optical alignment, the lamp 10, lenses 12 and 14, the image record 16', mirrors 18, 20, 22 and 24, the projection lens 25, the apertured mask 30, and the viewing screen 26. Only the mirror 18 rotates about the axis 32, each mirror 20, 22 and 24 rotates about the axis 34 as shown.

The image record 16' is arranged as shown in the drawing with information items arranged in a rectangular matrix having two columns and five rows. With this arrangement, the mirrors can easily be arranged so that the readout device projects on the viewing screen 26 the decimal digit whose binary equivalent is applied to the actuators that operate the mirrors. More particularly, for this operation, in the bit ZERO position the mirror 18 projects a character in the row of even-numbered decimal digits along the vertical line passing through the aperture 28, and in the ONE position projects a digit from the row of ODD decimal digits to be vertically in line with the aperture. Shifting the bit 2 mirror 20 between its two positions moves the image on the viewing screen between the 0–1 and 2–3 rows, and the bit 3 mirror 22 rotates through an angle such as to shift the image on the screen 26 between the 0–1 and 4–5 rows. The bit 4 mirror 24 is rotated to its ONE position to project the 8–9 row when the mirror 20 is in its ZERO position. With this arrangement, when all of the mirrors are in the ZERO positions, i.e., when the actuators receive the binary number 0000, the decimal digit 0 is projected onto the viewing screen 26. When the bit 1, 2, 3 and 4 mirrors are respectively in the 1000 positions, corresponding to the binary number 1, the decimal digit 1 is projected onto the viewing screen. The remaining decimal numbers up to 9 are separately projected onto the viewing screen when the mirror positions are arranged according to the corresponding binary numbers, with the bit 1 mirror 18 receiving the least significant digit and the bit 4 mirror 24 receiving the most significant digit.

In the readout devices of FIGURES 1 and 3, the actuators rotate through predetermined angles to direct the "shadows" of different information items on the image plate onto the viewing screen. The actuators rotating mirrors about parallel axes, i.e. rotating the mirrors 20, 22 and 24 in FIGURE 3, rotate through different angles each of which is equal to one-half the angle through which the mirror is to shift the beam. This same result can be obtained with an alternate mirror structure shown in FIGURE 4 and comprising a mirror indicated at 60 having two segments 62 and 64 arranged with an obtuse angle between them equal to one-half the angle through which the optical beam is to be shifted by the particular mirror. A linear actuator 66 is connected with the mirror, which is mounted for translatory motion, to move the mirror between the two positions 60*a* and 60*b*. In the position 60*a*, the mirror segment 62 is in the path of the optical beam and reflects it according to the angle between the segment 62 and the beam 68. When the mirror is in the other position 60*b*, indicated with dashed lines, the mirror segment 64 is in the path of the beam 68 and reflects it by an angular increment equal to two times the angle between the mirror segments 62 and 64.

When constructed either with actuators that rotate the mirrors as in FIGURES 1, 2 and 3 or with the multiple segment mirrors that undergo translatory movement, the readout device has one mirror for each digit of the input digital signal. All the mirrors move substantially simultaneously, and the overall response time of the readout device is determined by the motion time required for the mirror that undergoes the largest travel. Accordingly, the readout device is preferably constructed so that the mirror associated with the least significant digit undergoes the smallest travel, since this mirror is moved more often than the others, and with the mirrors associated with successively more significant digits undergoing successively larger movement.

The beam shifters can alternatively be constructed with optical materials that deflect an optical beam by different angles according to the amplitude of applied electric or magnetic fields. For example, the index of refraction of certain materials changes when the material is subjected to an electric field. Thus a series of refractors can be substituted for the mirrors, with beam deflection by each refractor depending on which of two (or more) discrete values of electric field are applied to the refractor.

It will be noted that in FIGURES 1 and 3 the image record 16, 16' is illuminated by the optical beam from the lamp 10 before the beam impinges on the mirror.

The image record can also be disposed between the mirror 24 and the mask 30 and arranged so that the beam illuminates only the one selected item of information recorded thereon that is to be displayed on the viewing screen. The mask 30 is then not needed. However, with the former arrangement, the projected information item always appears at the same place on the viewing screen, greatly facilitating both human and machine reading.

Further, when the optical beam illuminates the image record before being deflected by the mirrors, a large display can be produced with a very small, highly compact image record. Thus, this arrangement of the readout device is very desirable for image retrieval systems.

With further regard to the image record, in the illustrated embodiment of the invention, a "shadow" of all the information items recorded on the image record is imparted to the optical beam by passing the beam through the record. The image record can alternatively be arranged to reflect, rather than transmit, the beam to impart shadows of the information items to the beam. For this alternative arrangement, information is recorded on the image record by varying the reflection coefficient of the illuminated surface in accordance with the information to be recorded.

It will thus be seen that the invention provides an information readout device that develops an optical display of an item of information, which can be a single character, a digital word, or a full page or the like of characters, in response to a digital signal. The device responds substantially instantaneously to all the digits of the input digital signal and can readily be constructed either to retain the output display or to terminate it when the input signal terminates.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to be secured by Letters Patent is:

1. A digital readout device comprising in combination
- (A) image record means having at least four items of information recorded thereon in a preselected spatial relation,
- (B) source means for producing an optical beam that illuminates said information items simultaneously,
- (C) means forming a viewing screen,
- (D) first and second optical beam-shifting means
  - (1) each of which assumes only first and second different conditions in response to different electrical signals applied thereto,
  - (2) said first beam-shifting means directing said beam, after it impinges on said record means, to first and second different positions on said second beam-shifting means when it is in said first and second conditions respectively,
  - (3) said second beam-shifting means directing said beam from each of said first and second positions to different positions relative to said viewing screen when it is in said first and second conditions respectively,
  - (4) so that each of said information items is separately projecting onto said viewing screen according to the conditions of said first and second beam-shifting means, and
- (E) an optically opaque mask,
  - (1) having means forming an optically transparent aperture therein,
  - (2) disposed intermediate said second beam-shifting means and said viewing screen with said aperture in optical alignment with said viewing screen,
- (F) said beam-shifting means being structured to project through said aperture only the information item to be displayed on said viewing screen.

2. An optical projection digital readout device comprising in combination
- (A) an optical image record having at least first and second items of information recorded thereon spaced from each other,
- (B) means projecting an optical beam on said image record such that both of said information items recorded on said record are illuminated,
- (C) a viewing screen,
- (D) optical reflecting means,
  - (1) having an optical reflective surface,
    - (a) disposed in optical alignment with the path of said beam between said image record and said viewing screen,
    - (b) movable to only first and second preselected positions,
  - (2) projecting only said first item on said viewing screen when said reflective surface is in said first position and projecting only said second item on said display screen when said reflective surface is in said second position, and
  - (3) having actuator means coupled with said surface and responding to different electrical signals to move said reflective surface to any one of said first and second preselected positions, and
- (E) an optically opaque mask disposed intermediate said reflecting means and said viewing screen, said mask having means forming an optically transparent aperture therethrough optically aligned with said reflective surface and said viewing screen so that the only shadow in said beam of said information item to be displayed passes through said aperture.

3. An optical projecting digital readout device comprising in combination
- (A) an optical source for projecting an optical beam, including a lamp and an optical condensing system,
- (B) an image record
  - (1) disposed in the path of said beam to be illuminated thereby, and
  - (2) having items of information recorded thereon spaced in a logically ordered array, and
  - (3) producing in response to said incident beam an emitted beam having a shadow of each information item,
- (C) a display screen,
- (D) first and second optical mirrors,
  - (1) said first mirror being in the path of said beam between said image record and said second mirror and being movable to a first position to direct the beam from said path to a first position on said second mirror and being movable to a second position to direct said beam to a second position on said second mirror,
  - (2) said second mirror being in the path of said beam between said first mirror and said screen and movable to third and fourth positions, said second mirror directing the beam from said first mirror to different positions on said viewing screen when in said third and fourth positions,
- (E) first and second actuator means coupled with said first and second mirrors respectively, each actuator means moving said associated mirror between the selected positions thereof in response to first and second digital signals, and (F) an optically opaque mask intermediate said second mirror and said display screen, said mask having an optically transparent aperture therein having a size sufficient to pass the shadow of only one information item onto said display screen.

References Cited

UNITED STATES PATENTS

| | | | |
|---|---|---|---|
| 2,467,950 | 4/1949 | Thompson | 346—109 |
| 2,497,042 | 2/1950 | Doll | 88—1 |
| 2,600,168 | 6/1952 | Klyce | 95—4.5 |
| 2,808,768 | 10/1957 | Squassoni | 88—24 |
| 3,134,297 | 5/1964 | Carlson et al. | 88—1 |
| 3,142,224 | 7/1964 | Andrews et al. | 88—24 |
| 3,220,305 | 11/1965 | Gelder et al. | 88—24 |
| 3,256,524 | 6/1966 | Stauffer | 346—109 |
| 3,278,941 | 10/1966 | Cheney | 346—109 |

NORTON ANSHER, *Primary Examiner.*

R. M. SHEER, *Assistant Examiner.*